(12) United States Patent
Olson et al.

(10) Patent No.: US 7,294,657 B2
(45) Date of Patent: Nov. 13, 2007

(54) CURABLE ACRYLATE COMPOSITIONS, METHODS OF MAKING THE COMPOSITIONS AND ARTICLES MADE THEREFROM

(75) Inventors: Daniel Robert Olson, Voorheesville, NY (US); Dennis Joseph Coyle, Clifton Park, NY (US); Christian Andrew Huntley, Schenectady, NY (US); Bret Ja Chisholm, Fargo, ND (US); Paul Michael Smigelski, Jr., Schenectady, NY (US); Alvin Un-Teh Chen, Fairfax, VA (US)

(73) Assignee: General Electric Company, Schenectady, NY (US)

( * ) Notice: Subject to any disclaimer, the term of this patent is extended or adjusted under 35 U.S.C. 154(b) by 421 days.

(21) Appl. No.: 11/074,272

(22) Filed: Mar. 7, 2005

(65) Prior Publication Data
US 2006/0199095 A1    Sep. 7, 2006

(51) Int. Cl.
C08F 12/30    (2006.01)
G02B 5/00    (2006.01)
G02B 1/10    (2006.01)

(52) U.S. Cl. .................. 522/180; 526/286; 359/580
(58) Field of Classification Search ............ 522/180, 522/182; 526/286; 359/580
See application file for complete search history.

(56) References Cited

U.S. PATENT DOCUMENTS

| | | | |
|---|---|---|---|
| 5,969,867 A | 10/1999 | Fukushima et al. | |
| 6,206,550 B1 | 3/2001 | Fukushima et al. | |
| 6,657,029 B2 * | 12/2003 | Vanderbilt | 526/258 |
| 6,673,886 B2 | 1/2004 | Vanderbilt | |
| 6,800,709 B2 | 10/2004 | Aert et al. | |
| 6,818,291 B2 | 11/2004 | Funkenbusch et al. | |
| 6,833,391 B1 | 12/2004 | Chisholm et al. | |
| 7,087,659 B2 * | 8/2006 | Chisholm et al. | 522/64 |
| 2002/0091174 A1 | 7/2002 | Soane et al. | |
| 2003/0114619 A1 | 6/2003 | Suyal et al. | |
| 2003/0224250 A1 | 12/2003 | Setthachayanon et al. | |
| 2004/0032658 A1 | 2/2004 | Fleming | |
| 2004/0033369 A1 | 2/2004 | Fleming et al. | |
| 2004/0033384 A1 | 2/2004 | Funkenbusch et al. | |
| 2004/0033675 A1 | 2/2004 | Fleming et al. | |
| 2004/0132858 A1 | 7/2004 | Chisholm et al. | |
| 2004/0170924 A1 | 9/2004 | Kunimoto et al. | |
| 2004/0192804 A1 | 9/2004 | Kura et al. | |
| 2004/0194880 A1 | 10/2004 | Jiang et al. | |
| 2004/0242720 A1 | 12/2004 | Chisholm et al. | |
| 2004/0249100 A1 | 12/2004 | Chisholm et al. | |
| 2006/0128852 A1 * | 6/2006 | Coyle et al. | 524/261 |
| 2006/0187366 A1 * | 8/2006 | Sugimoto et al. | 349/10 |

FOREIGN PATENT DOCUMENTS

| | | |
|---|---|---|
| DE | 40 11 868 | 10/1991 |
| EP | 0 735 062 | 1/2002 |
| JP | 07206944 A | 8/1995 |
| JP | 2002187920 | 7/2002 |
| JP | 2002212514 A | 7/2002 |
| WO | WO 02/100911 | 12/2002 |

OTHER PUBLICATIONS

International Search Report dated Aug. 14, 2006.

* cited by examiner

*Primary Examiner*—Susan Berman

(57) ABSTRACT

A composition comprising a phenylthioethylacrylate, a multifunctional (meth)acrylate, a curing agent, wherein the phenylthioethylacrylate comprises less than about 400 parts per million tin and less than about 2 percent by weight of the corresponding phenylthioethanol. The composition may further comprise at least one unsaturated acid.

16 Claims, 5 Drawing Sheets

CURABLE ACRYLATE COMPOSITIONS, METHODS OF MAKING THE COMPOSITIONS AND ARTICLES MADE THEREFROM

BACKGROUND OF THE INVENTION

This invention relates to a curable acrylate coating composition. More particularly the invention relates to a curable acrylate coating composition, method of making said composition and articles made using said composition.

Prior art brightness-enhancing films typically comprise a high refractive index coating on polyester film. Brightness enhancing films based on polyester do not have as high a luminance as those based on polycarbonate—probably due to inherent haziness of polyester. Further, these brightness enhancing films for optical displays must pass a battery of tests to ensure long-term performance. In one of the tests, thermal aging for 1000 hours at 85° C., brightness enhancing films comprising coating formulations containing phenylthioethylacrylate on polycarbonate film develop an unacceptable amount of haze and loss of luminance.

Hence, there exists a need to provide coating compositions which retain their optical brightness, i.e., do not develop excessive haze, particularly in applications where the brightness of the article is an important consideration.

BRIEF SUMMARY OF THE INVENTION

The present invention provides a curable acrylate coating composition. The composition comprises, (a) a phenylthioethylacrylate having formula I

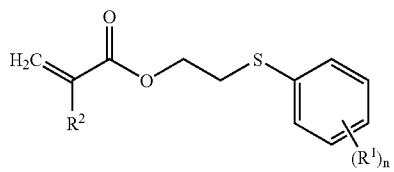

FORMULA I wherein $R^1$ is independently at each occurrence selected from the group consisting of a $C_1$-$C_{10}$ aliphatic radical, a $C_3$-$C_{20}$ aromatic radical and a $C_3$-$C_{12}$ cycloaliphatic radical, $R^2$ is a $C_1$-$C_{10}$ aliphatic radical and "n" has a value 0-5, the phenylthioethylacrylate (hereinafter at times referred to as PTEA) having formula I comprising less than about 400 parts per million (hereinafter at times referred to as ppm) tin and less than about 2 percent by weight of the corresponding phenylthioethanol (hereinafter at times referred to as PTE) having formula II

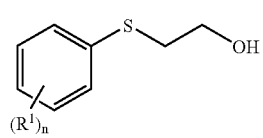

Formula II wherein $R^1$ is independently at each occurrence selected from the group consisting of a $C_1$-$C_{10}$ aliphatic radical, a $C_3$-$C_{20}$ aromatic radical and a $C_3$-$C_{12}$ cycloaliphatic radical and "n" has a value 0-5;

(b) at least one multifunctional (meth)acrylate; and
(c) at least one curing agent.

In an additional embodiment the curable acrylate coating composition further comprises at least one unsaturated acid. The unsaturated acid may be present in an amount corresponding to from about 0.1 weight percent to 1.0 weight percent based on the total weight of the curable acrylate coating composition.

In one other embodiment the present invention provides a method for preparing a curable acrylate coating composition. The method comprises, (i) blending component (a)-(d) to form a mixture wherein
(a) is a PTEA having formula I, comprising less than about 400 ppm tin and less than about 2 percent by weight of the corresponding PTE having formula II;
(b) is at least one multifunctional (meth)acrylate; and
(c) is at least one curing agent; and (ii) heating the mixture to form a homogenous composition.

In one embodiment the present invention provides an article comprising a cured acrylate composition, said composition comprising structural units derived from (a) a PTEA having formula I, wherein said PTEA having formula I comprises less than about 400 ppm tin and less than about 2 percent by weight of the corresponding PTE having formula II; and
(b) at least one multifunctional (meth)acrylate.

In one aspect the present invention provides a curable coating composition comprising (a) PTEA having formula III,

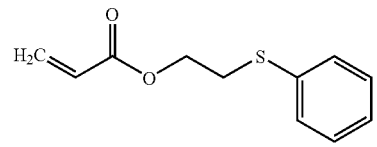

Formula III wherein the PTEA having formula III comprises less than about 400 parts per million tin and less than about 2 percent by weight of the corresponding PTE having formula IV,

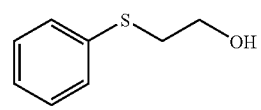

Formula IV (a) at least one multifunctional (meth)acrylate; and
(b) at least one curing agent.

In one embodiment the present invention provides a cured acrylate coating composition comprising structural units derived from (a) a PTEA having formula I, comprising less than about 400 parts per million tin, said PTEA comprising less than about 2 percent by weight of the corresponding PTE having formula II; and
(b) at least one multifunctional (meth) acrylate.

In one embodiment the present invention provides a cured acrylate coating composition on a substrate, the comprising structural units derived from (a) a PTEA having formula I, comprising less than about 400 parts per million tin, said PTEA comprising less than about 2 percent by weight of the corresponding PTE having formula II; and (b) at least one multifunctional (meth) acrylate.

DETAILED DESCRIPTION OF THE INVENTION

Figure 1:
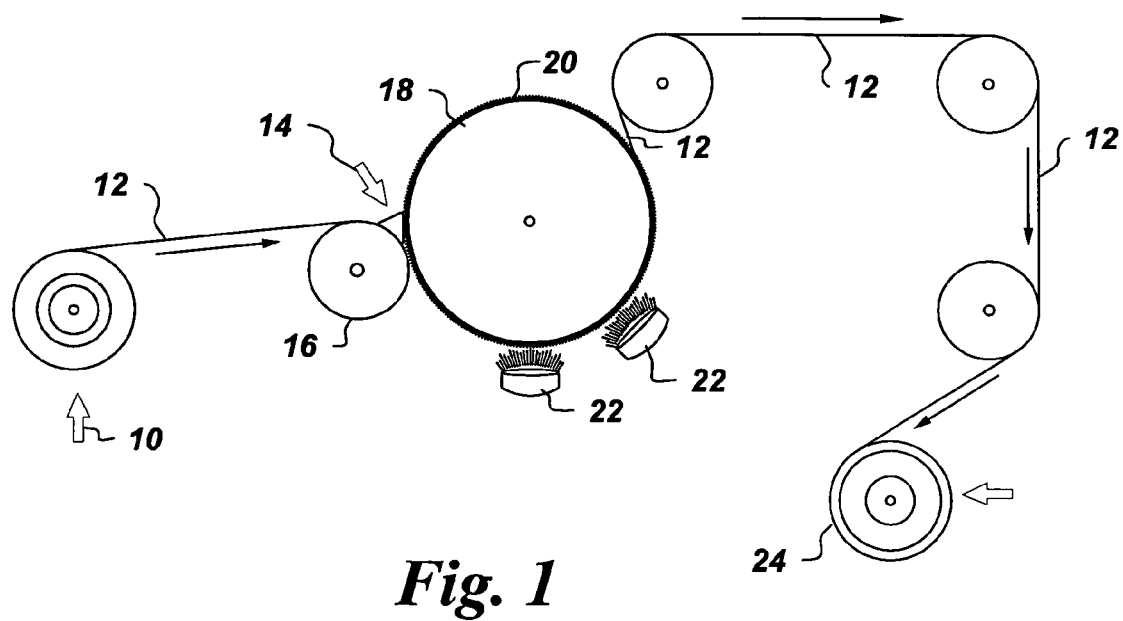
FIG. 1 shows a custom made coating machine manufactured by Innovative Machine Corporation, Birmingham, Ala. The coating machine has a wound uncoated substrate film (10). The uncoated substrate film was unwound across a web (12) and passed between the nip roll (16) and casting drum (18). The curable coating composition was applied as a coating bead (14) which was placed between the nip roll (16) and casting drum (18). The surface of the casting drum (18) was equipped with a metal form (20) attached to the outer surface, the metal form comprising surface microstructures. High intensity UV lamps equipped with V-bulbs (22) were used to cure the curable coating composition. The coated substrate film was rewound across the web (12) to provide the coated substrate film (24).

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

The modifier "about" used in connection with a quantity is inclusive of the stated value and has the meaning dictated by the context (e.g., includes the degree of error associated with measurement of the particular quantity).

As used herein the term "aliphatic radical" refers to a radical having a valence of at least one consisting of a linear or branched array of atoms that is not cyclic. The array may include heteroatoms such as nitrogen, sulfur, silicon, selenium and oxygen or may be composed exclusively of carbon and hydrogen. Aliphatic radicals may be "substituted" or "unsubstituted". A substituted aliphatic radical is defined as an aliphatic radical which comprises at least one substituent. A substituted aliphatic radical may comprise as many substituents as there are positions available on the aliphatic radical for substitution. Substituents which may be present on an aliphatic radical include but are not limited to halogen atoms such as fluorine, chlorine, bromine, and iodine. Substituted aliphatic radicals include trifluoromethyl; hexafluoroisopropylidene; chloromethyl; difluorovinylidene; trichloromethyl, bromoethyl, bromotrimethylene (e.g. —CH$_2$CHBrCH$_2$—), and the like. For convenience, the term "unsubstituted aliphatic radical" is defined herein to encompass, as part of the "linear or branched array of atoms which is not cyclic" comprising the unsubstituted aliphatic radical, a wide range of functional groups. Examples of unsubstituted aliphatic radicals include allyl, aminocarbonyl (i.e. —CONH$_2$), carbonyl, dicyanoisopropylidene (i.e. —CH$_2$C(CN)$_2$CH$_2$—), methyl (i.e. —CH$_3$), methylene (i.e. —CH$_2$—), ethyl, ethylene, formyl, hexyl, hexamethylene, hydroxymethyl (i.e. —CH$_2$OH), mercaptomethyl (i.e. —CH$_2$SH), methylthio (i.e. —SCH$_3$), methylthiomethyl (i.e. —CH$_2$SCH$_3$), methoxy, methoxycarbonyl, nitromethyl (i.e. —CH$_2$NO$_2$), thiocarbonyl, trimethylsilyl, t-butyldimethylsilyl, trimethyoxysilypropyl, vinyl, vinylidene, and the like. Aliphatic radicals are defined to comprise at least one carbon atom. A $C_1$-$C_{10}$ aliphatic radical includes substituted aliphatic radicals and unsubstituted aliphatic radicals containing at least one but no more than 10 carbon atoms.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthracenyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —(CH$_2$)$_4$—. Aromatic radicals may be "substituted" or "unsubstituted". A substituted aromatic radical is defined as an aromatic radical which comprises at least one substituent. A substituted aromatic radical may comprise as many substituents as there are positions available on the aromatic radical for substitution. Substituents which may be present on an aromatic radical include, but are not limited to halogen atoms such as fluorine, chlorine, bromine, and iodine. Substituted aromatic radicals include trifluoromethylphenyl, hexafluoroisopropylidenebis(4-phenyloxy) (i.e. —OPhC(CF$_3$)$_2$PhO—), chloromethylphenyl; 3-trifluorovinyl-2-thienyl; 3-trichloromethylphenyl (i.e. 3-CCl$_3$Ph-), bromopropylphenyl (i.e. BrCH$_2$CH$_2$CH$_2$Ph—), and the like. For convenience, the term "unsubstituted aromatic radical" is defined herein to encompass, as part of the "array of atoms having a valence of at least one comprising at least one aromatic group", a wide range of functional groups. Examples of unsubstituted aromatic radicals include 4-allyloxyphenoxy, aminophenyl (i.e. H$_2$NPh-), aminocarbonylphenyl (i.e. NH$_2$COPh-), 4-benzoylphenyl, dicyanoisopropylidenebis(4-phenyloxy) (i.e. —OPhC(CN)$_2$PhO—), 3-methylphenyl, methylenebis (4-phenyloxy) (i.e. —OPhCH$_2$PhO—), ethylphenyl, phenylethenyl, 3-formyl-2-thienyl, 2-hexyl-5-furanyl; hexamethylene-1,6-bis(4-phenyloxy) (i.e. —OPh(CH$_2$)$_6$PhO—); 4-hydroxymethylphenyl (i.e. 4-HOCH$_2$Ph-), 4-mercaptomethylphenyl (i.e. 4HSCH$_2$Ph-), 4-methylthiophenyl (i.e. 4-CH$_3$SPh-), methoxyphenyl, methoxycarbonylphenyloxy (e.g. methyl salicyl), nitromethylphenyl (i.e. -PhCH$_2$NO$_2$), trimethylsilylphenyl, t-butyldimethylsilylphenyl, vinylphenyl, vinylidenebis(phenyl), and the like. The term "a $C_3$-$C_{10}$ aromatic radical" includes substituted aromatic radicals and unsubstituted aromatic radicals containing at least three but no more than 10 carbon atoms. The aromatic radical 1-imidazolyl ($C_3H_2N_2$—) represents a $C_3$ aromatic radical. The benzyl radical ($C_7H_8$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. Cycloaliphatic radicals may be "substituted" or "unsubstituted". A substituted cycloaliphatic radical is defined as a cycloaliphatic radical which comprises at least one substituent. A substituted cycloaliphatic radical may comprise as many substituents as there are positions available on the cycloaliphatic radical for substitution. Substituents which may be present on a cycloaliphatic radical include but are not limited to halogen atoms such as fluorine, chlorine, bromine, and iodine. Substituted cycloaliphatic radicals include trifluoromethylcyclohexyl, hexafluoroisopropylidenebis(4-cyclohexyloxy) (i.e. —O $C_6H_{10}C(CF_3)_2$ $C_6H_{10}O$—), chloromethylcyclohexyl; 3-trifluorovinyl-2-cyclopropyl; 3-trichloromethylcyclohexyl (i.e. 3-$CCl_3C_6H_{10}$—), bromopropylcyclohexyl (i.e. $BrCH_2CH_2CH_2$ $C_6H_{10}$—), and the like. For convenience, the term "unsubstituted cycloaliphatic radical" is defined herein to encompass a wide range of functional groups Examples of cycloaliphatic radicals include 4-allyloxycyclohexyl, aminocyclohexyl (i.e. $H_2N$ $C_6H_{10}$—), aminocarbonylcyclopentyl (i.e. $NH_2COC_5H_8$—), 4-acetyloxycyclohexyl, dicyanoisopropylidenebis(4-cyclohexyloxy), (i.e. —O $C_6H_{10}C(CN)_2$ $C_6H_{10}O$—), 3-methylcyclohexyl, methylenebis(4-cyclohexyloxy) (i.e. —O $C_6H_{10}CH_2$ $C_6H_{10}O$—), ethylcyclobutyl, cyclopropylethenyl, 3-formyl-2-terahydrofuranyl, 2-hexyl-5-tetrahydrofuranyl; hexamethylene-1,6-bis(4-cyclohexyloxy) (i.e. —O $C_6H_{10}$ $(CH_2)_6$ $C_6H_{10}O$—); 4-hydroxymethylcyclohexyl (i.e. 4-$HOCH_2$ $C_6H_{10}$—), 4-mercaptomethylcyclohexyl (i.e. 4-$HSCH_2$ $C_6H_{10}$—), 4-methylthiocyclohexyl (i.e. 4-$CH_3S$ $C_6H_{10}$—), 4-methoxycyclohexyl, 2-methoxycarbonylcyclohexyloxy (2-$CH_3OCO$ $C_6H_{10}O$—), nitromethylcyclohexyl (i.e. $NO_2CH_2C_6H_{10}$—), trimethylsilylcyclohexyl, t-butyldimethylsilylcyclopentyl, 4-trimethoxysilylethylcyclohexyl (e.g. $(CH_3O)_3$ $SiCH_2CH_2C_6H_{10}$—), vinylcyclohexenyl, vinylidenebis(cyclohexyl), and the like. The term "a $C_3$-$C_{10}$ cycloaliphatic radical" includes substituted cycloaliphatic radicals and unsubstituted cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

As noted the present invention generally refers to a curable acrylate coating composition. It has been discovered that the curable acrylate coating composition of the present invention reduces the propensity towards haze formation in an article comprising the composition. It has been discovered that using PTEA having formula I, comprising less than about 400 ppm tin and less than about 2 percent by weight of the corresponding PTE having formula II, results in a marked reduction in haze development in articles prepared from the curable acrylate coating composition. It has also been discovered that incorporating an unsaturated acid in the composition in an amount corresponding to about 0.1 weight % to about 1.0 weight % based on the total weight of the curable acrylate coating composition results in a marked reduction in haze development in articles comprising the cured acrylate coating composition. The curable acrylate coating composition of the present invention is obtained by blending a PTEA of formula I, comprising less than about 400 ppm tin and less than about 2 percent by weight of the corresponding PTE having formula II, at least one multifunctional (meth)acrylate, and at least one curing agent.

The curable acrylate coating composition according to the present invention comprises PTEA, represented by the formula I,

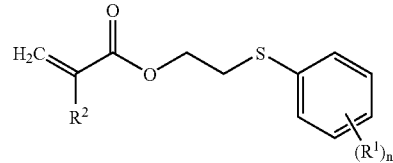

FORMULA I wherein $R^1$ is independently at each occurrence selected from the group consisting of a $C_1$-$C_{10}$ aliphatic radical, a $C_3$-$C_{20}$ aromatic radical and a $C_3$-$C_{12}$ cycloaliphatic radical, $R^2$ is a $C_1$-$C_{10}$ aliphatic radical and "n" has a value 0-5, the PTEA comprising less than about 400 parts per million tin and less than about 2 percent by weight of the corresponding PTE having formula II,

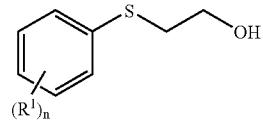

Formula II wherein $R^1$ is independently at each occurrence selected from the group consisting of a $C_1$-$C_{10}$ aliphatic radical, a $C_3$-$C_{20}$ aromatic radical and a $C_3$-$C_{12}$ cycloaliphatic radical and "n" has a value 0-5.

In one embodiment PTEA is represented by Formula III,

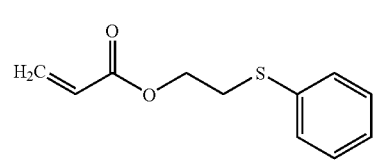

Formula III wherein the PTEA comprises less than about 400 ppm tin and less than about 2 percent by weight of the corresponding PTE having formula IV,

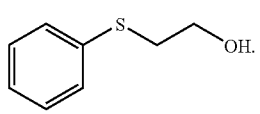

Formula IV

In one embodiment of the present invention, the PTEA of formula I, comprising less than about 400 ppm tin and less than about 2 percent by weight of the corresponding PTE having formula II, is present in the curable acrylate coating composition in an amount corresponding to from about 20 weight percent to about 60 weight percent based on the total weight of the composition. In another embodiment it is present in an amount corresponding to from about 30 weight percent to about 50 weight percent based on the total weight of the curable acrylate coating composition. In a preferred embodiment the PTEA of formula I, comprising less than about 2 percent by weight of the corresponding PTE having formula II, is present in amount corresponding to from about 35 weight percent to about 45 weight percent.

The multifunctional (meth)acrylate employed in the curable acrylate coating composition typically comprises at least one multifunctional (meth)acrylate of formula V

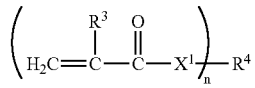

FORMULA V wherein $R^3$ is hydrogen or $C_1$-$C_{10}$ aliphatic radical; $X_1$ is O or S; $R^4$ is selected from the group consisting of $C_1$-$C_{20}$ aliphatic radical, a $C_3$-$C_{30}$ aromatic radical and a $C_3$-$C_{20}$ cycloaliphatic radical, and n is an integer having a value of 2 to 4. In various embodiments, $R^4$ may include groups such as alkylene and hydroxy alkylene disubstituted bisphenol-A or bisphenol-F ethers, preferably the brominated forms of bisphenol-A and bisphenol-F. In a preferred embodiment, $R^4$ has formula VI

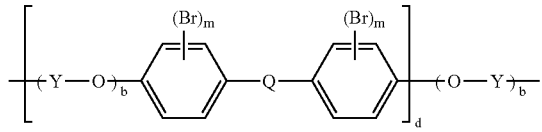

Formula VI wherein Q is —C(CH$_3$)$_2$—, —CH$_2$—, —C(O)—, —S—, —S(O)—, or —S(O)$_2$—; Y is $C_1$-$C_6$ aliphatic radical, b is an integer having a value 1 to 10, m is an integer having a value 0 to 4 and d is an integer having a value 1 to 3.

The multifunctional (meth)acrylates may include monomeric, dimeric and trimeric compounds produced by the reaction of an acrylic or methacrylic acid with a di-epoxide. Typically, the diepoxides employed are selected from the group consisting of bisphenol-A diglycidyl ether; bisphenol-F diglycidyl ether; tetrabromo bisphenol-A diglycidyl ether; tetrabromo bisphenol-F diglycidyl ether; 1,3-bis-{4-[1-methyl-1-(4-oxiranylmethoxy-phenyl)-ethyl]phenoxy}-propan-2-ol; 1,3-bis-{2,6-dibromo-4-[1-(3,5-dibromo-4-oxiranylmethoxy-phenyl)-1-methyl-ethyl]phenoxy}-propan-2-ol; and the like; and a combination comprising at least one of the foregoing di-epoxides.

Exemplary multifunctional (meth)acrylate compounds include 2,2-bis(4-(2-(meth)acryloxyethoxy)phenyl)propane; 2,2-bis((4-(meth)acryloxy)phenyl)propane; acrylic acid 3-(4-{1-[4-(3-acryloyloxy-2-hydroxy-propoxy)-3,5,-dibromo-phenyl]-1-methyl-ethyl}2,6-dibromo-phenoxy)-2-hydroxy-propyl ester; acrylic acid 3-[4-(1-{4-[3-(4-{1-[4-(3-acryloyloxy-2-hydroxy-propoxy)-3,5-dibromo-phenyl]-1-methyl-ethyl}-2,6-dibromo-phenoxy)-2-hydroxy-propoxy]-3,5-dibromo-phenyl}-1-methyl-ethyl)-2,6-dibromo-phenoxy]-2-hydroxy-propyl ester; and the like, and a combination comprising at least one of the foregoing multifunctional (meth)acrylates. In one embodiment the multifunctional (meth)acrylate is based on the reaction product of tetrabrominated bisphenol-A diglycidyl ether with acrylic acid i.e., RDX 51027 available from UCB Chemicals represented by formula VII.

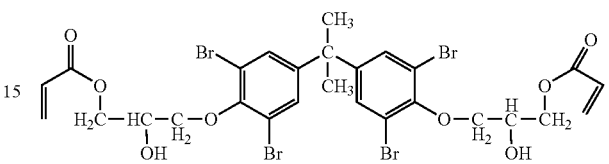

Formula VII

In one embodiment, the multifunctional (meth)acrylate is present in the curable acrylate coating composition in an amount corresponding to from about 25 to about 75 weight percent based on the total weight of the curable acrylate coating composition. In another embodiment the multifunctional (meth)acrylate is present in an amount corresponding to from about 30 weight percent to about 70 weight percent based on the total weight of the curable acrylate coating composition. In a preferred embodiment the multifunctional (meth)acrylate is present in an amount corresponding to from about 55 weight percent to about 65 weight percent based on the total weight of the curable acrylate coating composition.

In one embodiment, the curing agent employed in the curable acrylate coating composition is at least one photoinitiator or at least one thermal-initiator effective to promote polymerization of the curable acrylate coating composition when respectively exposed to ultraviolet radiation or heat. Suitable materials for use as a curing agent are identified in the U.S. Pat. No. 4,576,850, in the U.S. Pat. No. 6,848,986 and in such reference works as Encyclopedia of Polymer Technology. Examples of initiators include organic peroxides (e.g., benzoyl peroxide), azo compounds, quinones, nitroso compounds, acyl halides, hydrazones, mercapto compounds, pyrylium compounds, imidazoles, chlorotriazines, benzoin, benzoin alkyl ethers, diketones, phenones, benzoin ethers, hydroxy and alkoxyalkyl phenyl ketones, thioalkylphenyl morpholinoalkyl ketones acyl phosphine oxides and mixtures thereof. Examples of suitable commercially available, ultraviolet-activated photoinitiators are sold under the trade designations IRGACURE 651, IRGACURE 184, IRGACURE 369 and IRGACURE 819 (Bis(2,4,6-trimethylbenzoyl)-phenylphosphineoxide), all commercially available from the Ciba Geigy Company, Lucirin TPO-L, commercially available from BASF Corp. and DAROCUR 1173 commercially available from Merck & Co. Examples of suitable commercially available, thermal initiators are sold under the trade designations VAZO 52, VAZO 64 and VAZO 67 azo compound thermal initiators, all commercially available from E.I. duPont deNemours and Co. Exemplary curing agent particularly useful in many instances is a commercially available material designated IRGACURE 819 photoinitiator.

The curing agent is typically present in the curable acrylate coating composition in an amount corresponding to from about 0.1 to about 3.0 weight percent based on the total weight of the curable acrylate coating composition. In another embodiment the curing agent is present in an amount corresponding to from about 0.2 weight percent to about 1.0 weight percent based on the total weight of the curable acrylate coating composition. In a preferred embodiment the curing agent is present in an amount corresponding to from about 0.4 weight percent to about 0.6 weight percent based on the total weight of the curable acrylate coating composition.

In one embodiment the curable acrylate coating composition further comprises at least one surface active agent. The at least one surface active agent (surfactant) present in the curable acrylate coating compositions of the present invention typically include silicon containing surfactants. In one embodiment the silicon containing surfactants used in the curable acrylate coating compositions include dimethicone copolyols. The surface active agents are believed to assist in release of cured coatings from mold surfaces. Suitable surfactants include SILWET™ L-77, a polyalkylene oxide modified polydimethylsiloxane surfactant, SILWET™ L-720, a polyalkylene oxide modified polydimethylsiloxane surfactant, SILWET™ L-7600, a polyalkylene oxide modified polydimethylsiloxane surfactant and SILWET™ L-7602, a polyalkylene oxide modified polydimethylsiloxane surfactant all available commercially. In one embodiment the surfactant employed is SILWET™ L-7602.

The surface active agent is typically present in the curable acrylate composition in an amount corresponding to from about 0.05 to about 0.7 weight percent based on the total weight of the composition. In another embodiment the surface active agent is present in an amount corresponding to from about .0.1 weight percent to about 0.5 weight percent based on the total weight of the composition. In a preferred embodiment the surface active agent is present in an amount corresponding to from about 0.2 weight percent to about 0.3 weight percent.

In another embodiment the present invention provides a curable acrylate composition which further comprises an unsaturated acid. In one embodiment the unsaturated acid comprises a compound of the formula VIII

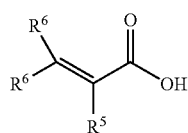

Formula VIII wherein $R^5$ and $R^6$ are independently at each occurrence selected from the group consisting of hydrogen, a —C(O)—OH group, a $C_1$-$C_6$ aliphatic radical, $C_3$-$C_{20}$ cycloaliphatic radical, and a $C_2$-$C_{20}$ aromatic radical. Suitable unsaturated carboxylic acids include acrylic acid, methacrylic acid, methylene malonic acid, fumaric acid, phenylfumaric acid, phenylthiofumaric acid, maleic acid, and methylene succinic acid. In one embodiment the acid employed is selected from the group consisting of acrylic acid and methacrylic acid. In a preferred embodiment the acid employed is acrylic acid.

In embodiments of the present invention which comprise an unsaturated acid, the unsaturated acid is typically present in an amount corresponding to from about 0.1 to about 1.0 weight percent based on the total weight of the curable acrylate composition. In a preferred embodiment the unsaturated acid is present in amount corresponding to from about 0.2 to about 0.5 weight percent based on the total weight of the curable acrylate composition.

The curable acrylate coating composition may, optionally, further comprise one or more additives selected from the group consisting of flame retardants, antioxidants, thermal stabilizers, ultraviolet stabilizers, dyes, colorants, antistatic agents, and the like, and a combination comprising at least one of the foregoing additives, so long as they do not deleteriously affect the polymerization of the composition or its end use. Selection of particular additives and their amounts employed may be performed by those skilled in the art without undue experimentation.

The curable acrylate coating composition of the present invention may be prepared by blending the components thereof, with efficient mixing and sufficient heating, for a sufficient time period to produce a homogenous composition. The temperature at which the mixture forms a homogenous composition without deleterious effect on the components dictates the temperature to which the mixture may be heated. For example, when UCB Inc. RDX51027 multifunctional (meth)acrylate (60 parts by weight (pbw)), PTEA having Formula III comprising 400 ppm tin and 0.16 weight percent PTE having formula IV, Ciba Specialty Chemicals IRGACURE 819 photoinitiator (0.50 pbw), and GE Silicones SILWET 7602 silicone copolymer (0.25 pbw) is blended, the mixture forms a homogeneous composition when heated to 85° C. and agitated several times over the course of 30 minutes.

The present invention provides curable acrylate coating compositions, methods for preparing the curable acrylate coating compositions, cured acrylate coating compositions prepared from the curable acrylate coating compositions, and articles comprising said cured acrylate coating compositions, wherein the component PTEA having formula I, of the curable acrylate coating composition comprises less than about 400 ppm tin and less than to about 2 weight percent of the corresponding PTE having formula II. PTEA having formula I containing tin impurities in excess of about 400 ppm tin may be purified by one or more base washes of the PTEA having formula I, which results in a dramatic decrease in the amount of tin present and only increases marginally the amount of the corresponding PTE having formula II, which may be present in the PTEA having formula I, being subjected to purification. PTEA having formula I, is thought to undergo hydrolysis upon exposure to aqueous base. Judicious selection of the conditions employed during the base washing of the PTEA having formula I, minimizes hydrolysis of PTEA having formula I to the corresponding PTE having formula II and the corresponding (meth)acrylic acid, and the amount of the corresponding PTE having formula II in the purified PTEA having formula I, does not exceed 2 weight percent. The bases used are generally selected from the group consisting of aqueous solutions of sodium hydroxide, sodium carbonate, sodium bicarbonate and a combination of the foregoing. For example, subjecting PTEA having formula III, comprising 2350 ppm tin and 0.14 weight percent of the corresponding PTE having formula IV, to a single base wash at ambient temperature using 5 weight percent sodium bicarbonate solution resulted in PTEA having formula III, comprising 400 ppm of tin and 0.16 weight percent of the corresponding PTE having formula IV.

The present invention also provides articles fabricated using the cured acrylate coating composition prepared from the curable acrylate coating compositions of the present invention. When forming articles from the curable acrylate coating composition, it is often preferred to remove air bubbles by application of vacuum or the like, with gentle heating if the mixture is viscous, and casting or otherwise creating a film of the composition on a desired surface.

Referring to FIG. 1, in one embodiment, a radiation curable acrylate coating composition (14) is applied to a surface of a uncoated base film substrate (10). The composition (14) may be applied on the base film substrate (10), then the base film substrate having the uncured composition coating can be passed through a compression nip defined by a nip roll (16) and a casting drum (18), where the casting drum may have a negative pattern master of the microstructures (20). The casting drum (18) may be maintained at a slightly elevated temperature, sufficient to ensure that the pattern of the microstructures gets imprinted on the coated side of the uncured film surface. The compression nip applies a sufficient pressure to the uncured composition (14) and the base film substrate (10) to control the thickness of the composition coating and to press the composition into full dual contact with both the base film substrate (10) and the casting drum (18) to exclude any air between the uncured composition (14) and the casting drum (18). The radiation curable composition is cured by directing radiation energy through the base film substrate from the surface opposite the surface having the composition coating while the composition is in full contact with the drum to cause the microstructured pattern to be replicated in the cured composition layer.

In one embodiment curable acrylate coating compositions are cured by subjecting to photo curing. In another embodiment the photo curing is carried out using ultraviolet (hereinafter referred to as UV) radiation, wherein the wavelength of the UV radiation corresponds to from about 1800 angstroms to about 4000 angstroms. The lamp systems used to generate such radiation include ultraviolet lamps and discharge lamps, as for example, xenon, metallic halide, metallic arc, low or high pressure mercury vapor discharge lamp, etc. Photo curing is meant to include both polymerization and cross-linking processes to form a non-tacky cured acrylate composition.

In one embodiment, the curable acrylate coating compositions are cured by subjecting to heat curing, thermal curing or electron-beam curing. In another embodiment the temperature at which the thermal curing is achieved, typically corresponds to from about 80° C. to about 130° C. In a preferred embodiment the temperature corresponds to from about 90° C. to about 110° C. In another embodiment the electron-beam curing is achieved, typically at electron-beam dosages ranging from about 10 kiloGray (kGy) or to about 100 kGy. In a preferred embodiment the electron-beam dosages is less than about 50 kGy or less depending on the nature of the polymer and amount of multifunctional additives present, with required dosages being lowered by the presence of a multifunctional additive. The presence of a multifunctional additive can also create a limit on the electron-beam dosages used. A peak is reached at some level after which the level of increase of elevated temperature shear will be reduced but still be above the level which existed prior to cure. Electron beam system as described U.S. Pat. No. 5,981,963 may be used to subject the curable acrylate coating composition to electron-beam curing.

The time period for which the curable acrylate coating composition is required to be heated to obtain a cured coating composition is dependent on the components of the curable acrylate coating compositions. Typically the time period corresponds to from about 30 seconds to about 24 hours. In another embodiment the time period corresponds to from about 0.1 minute to about 10 hours. In a preferred embodiment the time period corresponds to from about 2 minutes to about 5 hours. Such curing may be staged to produce a partially cured and often tack-free composition, which then is fully cured by heating for longer periods or temperatures within the aforementioned ranges.

In one embodiment the curable acrylate coating composition may be both UV cured and heat cured.

Figure 2:
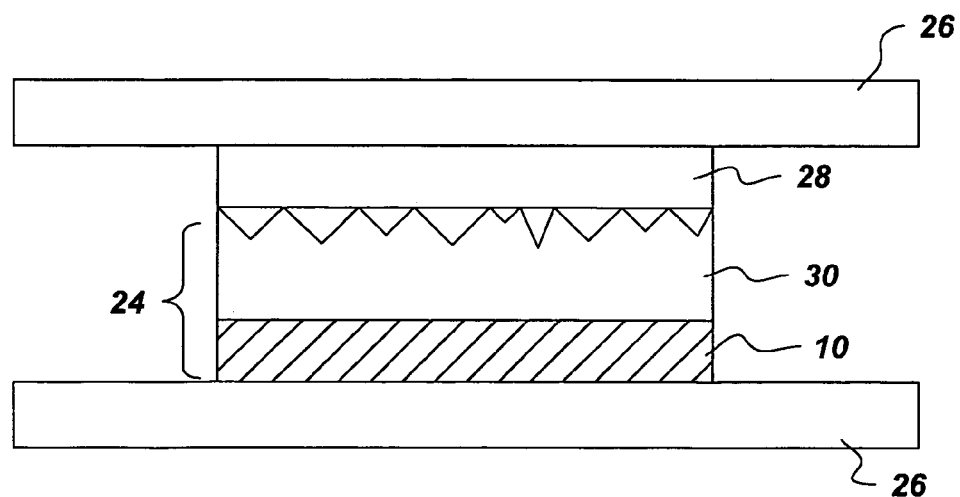
FIG. 2 shows an assembly used to subject the coated substrate film (24) to thermal aging. The coated substrate film comprising the substrate (10) and the cured acrylate coating comprising microstructures (30) was covered with a polycarbonate film (28) and assembled in a glass fixture (26).

The haze values of the articles prepared using the curable acrylate coating compositions of the present invention are measured using the assembly described in FIG. 2. The assembly consists of a glass fixture (26) consisting of a substrate film (10) coated with a cured acrylate coating composition (30) comprising surface microstructures which is in turn covered with a polycarbonate film (28), wherein the polycarbonate film (28) is in contact with microstructured surface of the cured coated substrate film. The initial haze of the covering polycarbonate film is measured using a BYK-GARDNER HAZE-GARD PLUS apparatus in accordance with the procedure set forth in ASTM D 1003. Then the assembly is placed in an oven and at fixed intervals the covering polycarbonate film is removed and measured to determine haze development as described above.

In one embodiment the present invention provides articles prepared from the curable acrylate coating compositions. Articles that may be fabricated from the compositions include, for example, optical articles, such as light management films, brightness enhancing films, for use in black-light displays; optical lenses; Fresnel lenses; optical disks; diffuser films, holographic substrate; or as substrates in combination with conventional lenses, prisms or mirrors.

The articles of the present invention are characterized by a surface with replicated microstructures comprising a plurality of utilitarian discontinuities, such as projections and depressions, which surface may be readily released from a mold after radiation curing without loss of the detail of the mold and with retention of the replication of such detail under a wide variety of conditions during use.

The term "microstructure" is used herein as defined and explained in U.S. Pat. No. 4,576,850, the disclosure of which is incorporated by reference herein. Thus, it means the configuration of a surface which depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about ±0.005 to ±750 microns, as measured by an optical or electron microscope, through a representative characteristic length of the surface, e.g., 1-30 cm. Said average center line can be piano, concave, convex, aspheric or combinations thereof. Articles where said deviations are of low order, e.g., from ±0.005 to ±0.1 or, preferably, to ±0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from ±0.1 to ±750 microns, and attributable to microstructure comprising a plurality of utilitarian discontinuities which are the same or different and spaced apart or contiguous in a random or ordered manner, are articles such as retroreflective cube-corner sheeting, linear Fresnel lenses, video discs and LMF's. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles. Typically, it may be necessary or desirable to select a particular oligomeric composition whose shrinkage upon curing does not result in such interfering extraneous discontinuities, e.g., a composition which shrinks only 2-6%, and this requirement is satisfied by the curable acrylate compositions of the present invention.

The articles have a wide variety of desired properties, such as toughness, flexibility, optical clarity and homogeneity, and resistance to common solvents. The microstructures of such articles have high thermal dimensional stability, resistance to abrasion and impact, and integrity even when the articles are bent to an angle as great as 180 degree. In one embodiment the articles made using the cured acrylate coating composition have a refractive index of at least 1.57.

While the invention has been described with reference to exemplary embodiments, it will be understood by those skilled in the art that various changes may be made and equivalents may be substituted for elements thereof without departing from the scope and spirit of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The invention is further illustrated by the following non-limiting examples.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C.

The haze value developed in the polycarbonate film, represented in FIG. 2 is determined by ASTM procedure D1003

PTEA and PTE referred to in the Examples are respectively PTEA having a formula III and the corresponding PTE having a formula IV. Amount of impurities i.e. tin and PTE in the PTEA are included in the Tables given below.

EXPERIMENTAL

Comparative Examples 1-5 illustrate the negative effect of residual PTE and residual tin catalyst on the performance of multilayer films prepared using compositions comprising PTEA containing PTE and tin impurities.

The curable acrylate coating composition of Comparative Example 1 was prepared by combining UCB Inc. RDX51027 epoxy acrylate (60 parts by weight (pbw)), PTEA (40 pbw; containing 0.14 wt % PTE, and 2350 ppm tin), Ciba Specialty Chemicals IRGACURE 819 photoinitiator (0.50 pbw), and GE Silicones SILWET 7602 silicone copolymer (0.25 pbw). The mixture was heated to 85° C. and agitated several times over the course of 30 minutes and a homogeneous solution was obtained.

The curable acrylate coating compositions of Comparative Examples 2-5 were prepared in a manner similar to Comparative Example 1, where in addition, the compositions were spiked with varying amounts of PTE, as indicated in Table 1 below.

The compositions provided in Table 1 were then individually used in the preparation of multilayered films comprising a polycarbonate substrate film and a cured acrylate film layer comprising microreplicated structures. The multilayer films were prepared using a custom made coating machine, manufactured by Innovative Machine Corporation, Birmingham, Ala. as depicted in the FIG. 1. 5 grams of the curable acrylate coating composition prepared as described for Comparative Example 1 was applied as a coating bead (14) across the web (12), by placing the coating bead (14) between a nip roll (16) and a casting drum (18) and passing the uncoated substrate film between the nip roll (16) and the casting drum (18). The casting drum was maintained at 50° C. The casting drum was equipped with a metal form (20) attached to its outer surface, the metal form comprising surface microstructures. The curable acrylate coating composition was cured using high intensity lamps (20) equipped with V-bulbs. The web (12) was operated at 50 feet per minute.

The thermal ageing of the multilayer films prepared as described above was carried out in the following manner. Each of the film was assembled in a glass fixture (26) along with a protective sheet of polycarbonate film (28) as shown in FIG. 2. Prior to assembling the films in this manner, the percentage haze of each protective sheet of polycarbonate film (28) was measured using a BYK-GARDNER HAZE-GARD PLUS apparatus in accordance with the procedure set forth in ASTM D 1003. The glass fixture containing the polycarbonate film (28) with the substrate coated with curable acrylate coating composition containing microreplicated structures (24), the substrate in this case being a polycarbonate film were then placed in an oven maintained at about 85° C. At various time intervals the assemblies were removed from the oven and the haze in the sheet of polycarbonate film (28) was measured as above.

Figure 3:
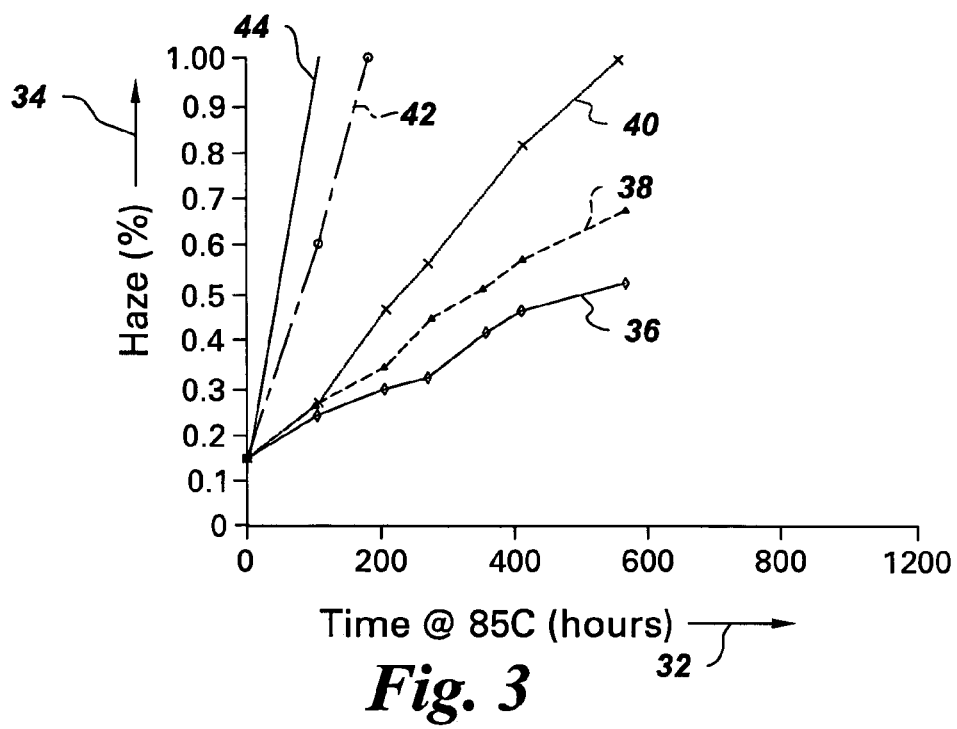
FIGS. 3-10 show the correlation between Haze (34) in the coated substrate film (24) and time in hours at 85° C. (32), when a curable acrylate coating composition is used as the coating.

The results of the thermal ageing tests are illustrated in Table 1 below and are depicted in FIG. 3. The data in FIG. 3 indicates that presence of residual PTE and residual tin in the curable acrylate coating compositions leads to haze development in polycarbonate film layer adjacent to the microreplicated film surface in the multilayer film, thus indicating that the adjacent polycarbonate film was sensitive to the presence of the PTE and tin impurities present initially in the curable acrylate composition employed. Formation of about 0.4% haze after 1000 hours at 85° C. is indicative of undesirable haze levels.

TABLE 1

| Comparative Example (CE) | Corresponding curve in FIG. 3 | Curable coating composition as prepared in comparative examples 1-5 | Additional PTE added (weight percent) | Time in hours | Haze |
| --- | --- | --- | --- | --- | --- |
| CE-1 | 36 | 100 | 0 | 0 | 0.15 |
| | | | | 109 | 0.265 |
| | | | | 205.5 | 0.344 |
| | | | | 270.5 | 0.324 |
| | | | | 357.5 | 0.411 |
| | | | | 409 | 0.463 |
| | | | | 567.5 | 0.527 |
| | | | | 883 | 0.634 |

TABLE 1-continued

| Comparative Example (CE) | Corresponding curve in FIG. 3 | Curable coating composition as prepared in comparative examples 1-5 | Additional PTE added (weight percent) | Time in hours | Haze |
|---|---|---|---|---|---|
| CE-2 | 38 | 99.9 | 0.1 | 0 | 0.15 |
|  |  |  |  | 109 | 0.265 |
|  |  |  |  | 205.5 | 0.344 |
|  |  |  |  | 270.5 | 0.446 |
|  |  |  |  | 357.5 | 0.512 |
|  |  |  |  | 409 | 0.573 |
|  |  |  |  | 567.5 | 0.676 |
|  |  |  |  | 883 | 0.868 |
| CE-3 | 40 | 99.8 | 0.2 | 0 | 0.15 |
|  |  |  |  | 109 | 0.265 |
|  |  |  |  | 205.5 | 0.462 |
|  |  |  |  | 270.5 | 0.567 |
|  |  |  |  | 357.5 | 0.717 |
|  |  |  |  | 409 | 0.821 |
|  |  |  |  | 567.5 | 1.011 |
|  |  |  |  | 883 | 1.202 |
| CE-4 | 42 | 99.5 | 0.5 | 0 | 0.15 |
|  |  |  |  | 109 | 0.598 |
|  |  |  |  | 205.5 | 1.143 |
|  |  |  |  | 270.5 | 1.201 |
|  |  |  |  | 357.5 | 1.422 |
|  |  |  |  | 409 | 1.526 |
|  |  |  |  | 567.5 | 1.630 |
|  |  |  |  | 883 | 1.74 |
| CE-5 | 44 | 99.0 | 1.0 | 0 | 0.15 |
|  |  |  |  | 109 | 0.987 |
|  |  |  |  | 205.5 | 1.686 |
|  |  |  |  | 270.5 | 1.871 |
|  |  |  |  | 357.5 | 1.92 |
|  |  |  |  | 409 | 1.853 |
|  |  |  |  | 567.5 | 1.9444 |
|  |  |  |  | 883 | 2.774 |

Examples 1-5 employed curable acrylate coating compositions identical to that described for Comparative Example 1 with an exception that the PTEA employed was washed one or more times with aqueous base prior to mixing with the other components of the curable acrylate coating composition. Examples 1-5 illustrate that base washing results in a dramatic reduction in the concentration of tin present in the PTEA with only a modest increase in the amount of PTE. The concentration of PTE is thought to increase due to base induced hydrolysis of the PTEA. These examples demonstrate the positive effect of reduced tin impurity levels in the purified PTEA on the performance of multilayer films prepared using the same.

In Example 1, to 1 liter of PTEA (containing 2350 ppm tin and 0.14% PTE) was added 100 milliliters (ml) of 5% sodium bicarbonate solution, and the mixture was vigorously shaken for about 1 minute. The layers were allowed to separate into an aqueous layer and an organic layer. The organic layer comprising PTEA was separated, slurried with magnesium sulfate 5 g per 100 g of PTEA in the organic layer and filtered. On analysis, the base-washed PTEA layer indicated the presence of 400 ppm tin and 0.16% PTE. The above purification process was used in Examples 2-5 with variations described in Table 2.

The base-washed PTEA of Examples 1-5 were then individually employed to prepare curable acrylate coating compositions. The curable acrylate coating compositions of Example 1-5 were prepared by combining UCB Inc. RDX51027 epoxy acrylate (60 parts by weight (pbw)), PTEA (40 pbw; PTEA subjected to various base washes as described in Table 2), Ciba Specialty Chemicals IRGA-CURE 819 photoinitiator (0.50 pbw), and GE Silicones SILWET 7602 silicone copolymer (0.25 pbw). The mixture was heated to 85° C. and agitated several times over the course of 30 minutes and a homogeneous solution was obtained.

These curable acrylate coating compositions were then individually used in the preparation of multilayered films comprising a polycarbonate substrate film and a cured acrylate film layer comprising microreplicated structures in a manner similar to that described in Comparative Example 1. The thermal ageing of the multilayer films prepared using the curable acrylate coating compositions of Example 1-5, was carried out in a manner similar to Comparative Example 1.

TABLE 2

Figure 4:
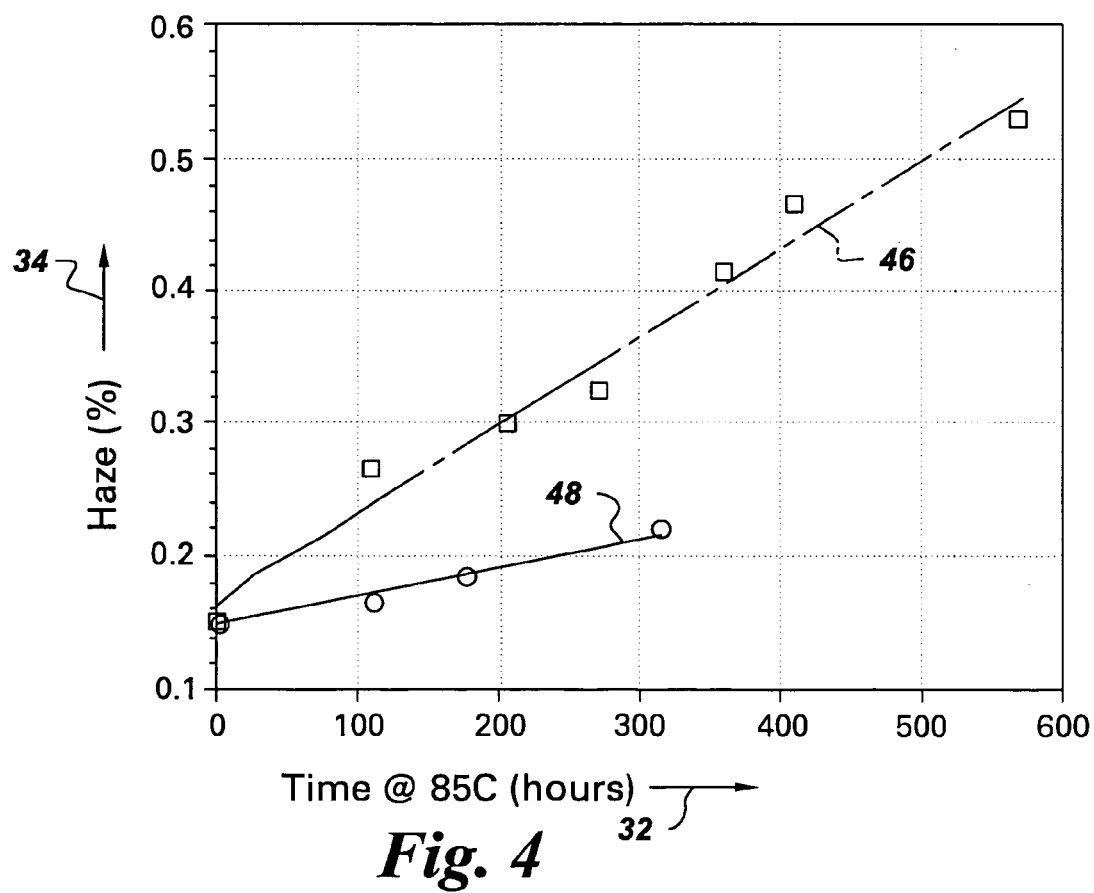

| Example | Corresponding curve in FIG. 4 | Base Washed PTEA | Tin in ppm | PTE in % | Time in Hours | Haze in % |
|---|---|---|---|---|---|---|
| 1 | 48 | PTEA Washed 1× with 5% NaHCO$_3$ | 400 | 0.16 | 0 | 0.15 |
|  |  |  |  |  | 168 | 0.20 |
|  |  |  |  |  | 303 | 0.24 |
|  |  |  |  |  | 578 | 0.27 |
| 2 | NA | PTEA Washed 2× with 5% NaHCO$_3$ | 220 | 0.15 | 0 | 0.15 |
|  |  |  |  |  | 168 | 0.16 |
|  |  |  |  |  | 303 | 0.20 |
|  |  |  |  |  | 578 | 0.20 |
| 3 | NA | PTEA Washed 3× with 5% NaHCO$_3$ | 18 | NA | 0 | 0.15 |
|  |  |  |  |  | 168 | 0.17 |
|  |  |  |  |  | 303 | 0.19 |
|  |  |  |  |  | 578 | 0.23 |
| 4 | NA | PTEA Washed 3× with 5% NaHCO$_3$ and 1× with 5% NaOH | 15 | NA | 0 | 0.15 |
|  |  |  |  |  | 168 | 0.18 |
|  |  |  |  |  | 303 | 0.24 |
|  |  |  |  |  | 578 | 0.26 |
| 5 | NA | PTEA Washed 3× with 5% NaHCO$_3$ and 2× with 5% NaOH | <10 | 0.21 | 0 | 0.15 |
|  |  |  |  |  | 168 | 0.15 |
|  |  |  |  |  | 303 | 0.18 |
|  |  |  |  |  | 578 | 0.19 |
| Comparative Example 6 | 46 | PTEA - No base wash | 2350 | 0.14 | 0 | .15 |
|  |  |  |  |  | 109 | .265 |
|  |  |  |  |  | 205.5 | .344 |
|  |  |  |  |  | 270.5 | .324 |
|  |  |  |  |  | 357.5 | .411 |
|  |  |  |  |  | 409 | .463 |
|  |  |  |  |  | 567.5 | .527 |
|  |  |  |  |  | 883 | .634 |

NA—Not Available

In Comparative Example 6, the PTEA used in Examples 1-5 (initially containing 2350 ppm tin and 0.14% PTE before base washing) was used without base washing to prepare a curable acrylate coating composition as described for Comparative Example 1. The curable acrylate coating composition was then used to prepare a multilayered film which was subjected to thermal aging as described above. The haze value obtained for the multilayered film prepared using the composition of Comparative Example 6 was compared with the haze values obtained in Example 1, as indicated in Table 2 above and FIG. 4.

Results illustrated by FIG. 4 which presents the haze values obtained from the multilayer film prepared using the curable acrylate coating composition of Example 1 and of Comparative Example 6 indicate that when curable acrylate coating compositions comprising base washed PTEA is used to prepare multilayer films the films show less propensity to haze.

Examples 6-9 employed curable acrylate compositions identical to that described for Comparative Example 1 with an exception that the PTEA used to prepare the curable acrylate composition was subjected to a single base wash and was also mixed with acrylic acid and/or PTE. The curable acrylate coating compositions were then individually used to prepare multilayer films and the films were subjected to thermal ageing as described above. Examples 6-9 illustrate that the performance of multilayer films improves when the curable acrylate coating composition used to prepare the films comprises acrylic acid and single base washed PTEA.

The curable acrylate coating composition of Example 6 was prepared by combining UCB Inc. RDX51027 epoxy acrylate (60 parts by weight (pbw)), single base-washed PTEA (40 pbw; as prepared in Example 1), Ciba Specialty Chemicals IRGACURE 819 photoinitiator (0.50 pbw), and GE Silicones SILWET 7602 silicone copolymer (0.25 pbw). The mixture was heated to 85° C. and agitated several times over the course of 30 minutes until a homogeneous solution was obtained.

The curable acrylate coating compositions of examples 7, 8 and 9 were prepared by adding specific amounts of acrylic acid and/or PTE to the curable acrylate coating composition of example 6, which are included in Table 3 below.

Multilayer films like that depicted in FIG. 2 were prepared using the curable acrylate coating compositions of examples 6 to 9 and thermal aging tests were carried out as described above.

Results, shown in Table 3 below and in the FIG. 5, indicate that acrylic acid appears to be effective in reducing propensity to haze during thermal aging even when higher levels of PTE, such as 1.5%, are present in the curable acrylate coating composition.

TABLE 3

Figure 5:
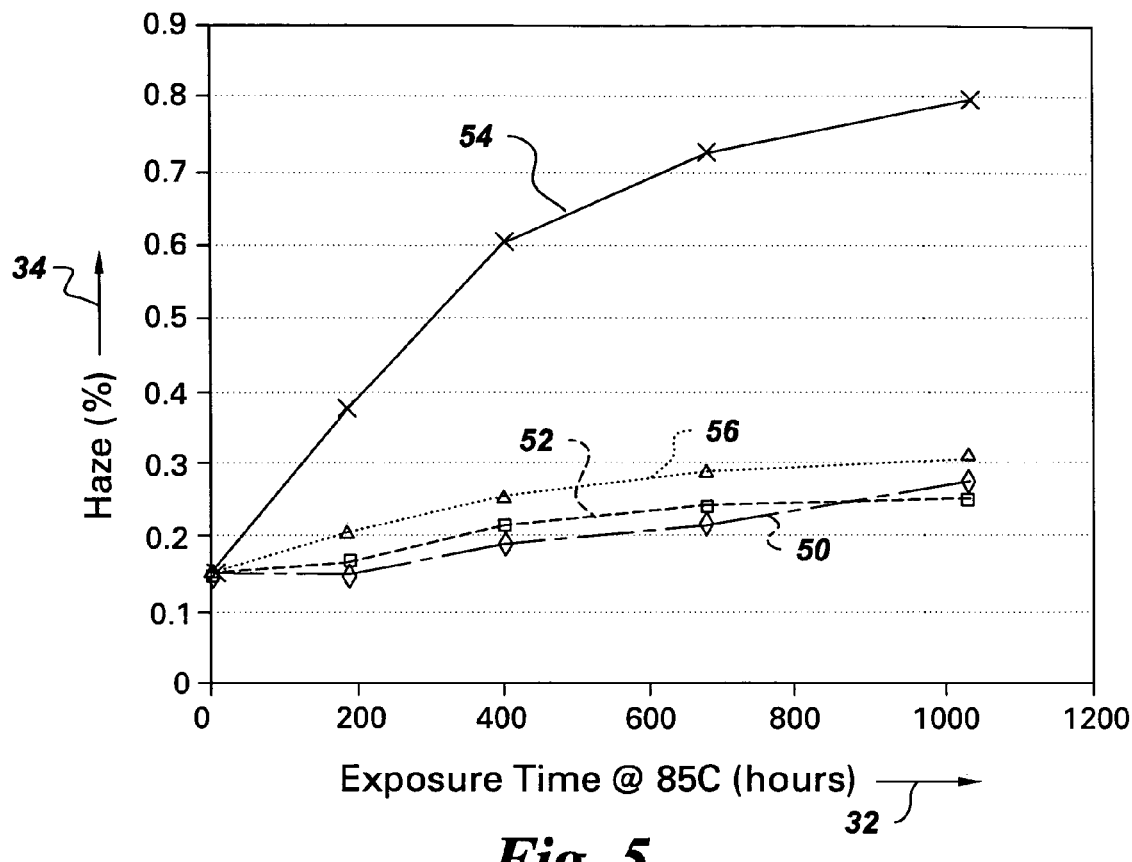

| Example | Corresponding curve in FIG. 5 | Curable acrylate coating composition comprising single base washed PTEA | Acrylic Acid in pbw | PTE in pbw | Time in hours | Haze |
|---|---|---|---|---|---|---|
| 6 | 50 | 100 | 0 | 0 | 0 | 0.15 |
|   |    |     |   |   | 198 | 0.15 |
|   |    |     |   |   | 401 | 0.18 |
|   |    |     |   |   | 695 | 0.21 |
|   |    |     |   |   | 1028 | 0.28 |
| 7 | 52 | 99.5 | 0.5 | 0 | 0 | 0.15 |
|   |    |      |     |   | 198 | 0.16 |
|   |    |      |     |   | 401 | 0.21 |
|   |    |      |     |   | 695 | 0.24 |
|   |    |      |     |   | 1028 | 0.25 |
| 8 | 54 | 98.5 | 0 | 1.5 | 0 | 0.15 |
|   |    |      |   |     | 198 | 0.38 |
|   |    |      |   |     | 401 | 0.61 |
|   |    |      |   |     | 695 | 0.73 |
|   |    |      |   |     | 1028 | 0.79 |
| 9 | 56 | 98 | 0.5 | 1.5 | 0 | 0.15 |
|   |    |    |     |     | 198 | 0.20 |
|   |    |    |     |     | 401 | 0.25 |
|   |    |    |     |     | 695 | 0.29 |
|   |    |    |     |     | 1028 | 0.303 |

Example 10-12 employed curable acrylate coating compositions identical to that described for Comparative Example 1 with an exception that the PTEA used to prepare the curable acrylate coating composition was subjected to a single base wash and was also optionally spiked with PTE. The curable acrylate coating positions were then individually used to prepare multilayer films and the films were subjected to thermal ageing as described above. Examples 10-12 illustrate that the cured acrylate coating compositions prepared using a single base washed PTEA improves the performance of the multilayer films prepared using composition.

The curable acrylate coating composition of example 10 was prepared by combining UCB Inc. RDX51027 epoxy acrylate (60 parts by weight (pbw)), single base-washed PTEA (40 pbw; as prepared in example 1), Ciba Specialty Chemicals IRGACURE 819 photoinitiator (0.50 pbw), and GE Silicones SILWET 7602 silicone copolymer (0.25 pbw). The mixture was heated to 85° C. and agitated several times over the course of 30 minutes until a homogeneous solution was obtained.

The curable acrylate coating compositons of examples 11 and 12 were prepared by adding specific amounts of PTE to the curable acrylate coating composition of example 10, which are included in Table 4 below.

Multilayer films like that depicted in FIG. 2 were prepared using the curable acrylate coating compositions of examples 10 to 12 and thermal aging tests were carried out as described above.

The results shown in Table 4 below and in the FIG. 6, indicate that the use of a base washed PTEA in the preparation of curable acrylate coating composition renders the compositions insensitive to the presence of minor amounts of PTE which may also present in the curable acrylate coating compositions.

TABLE 4

Figure 6:
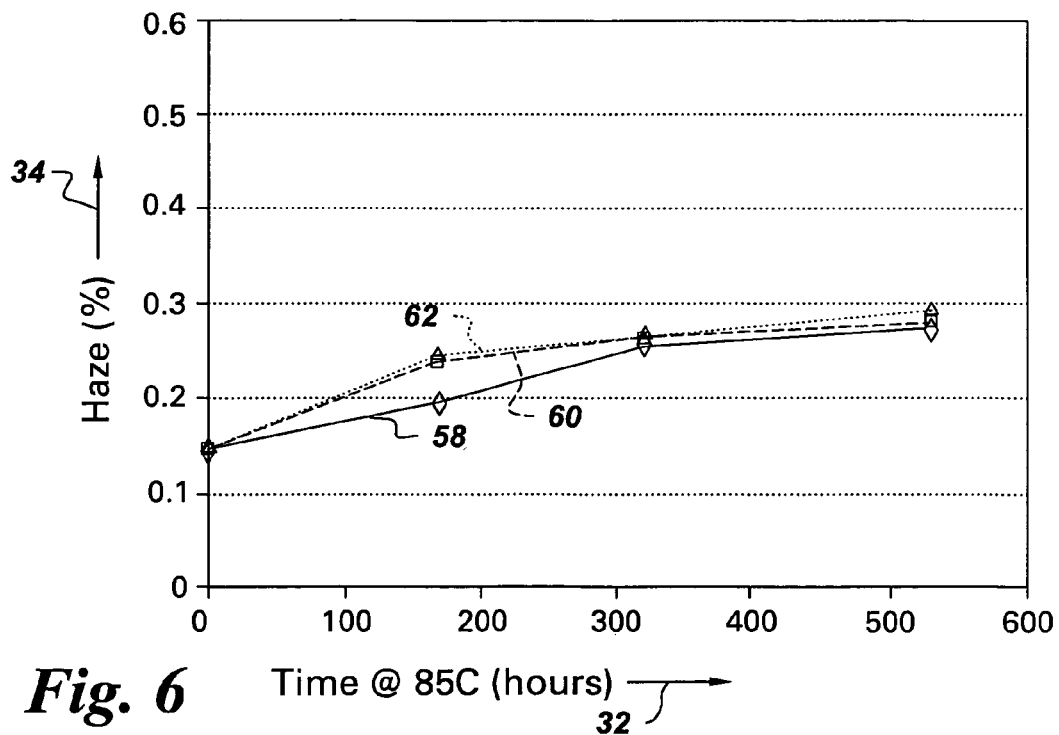

| Example | Corresponding curve in FIG. 6 | Curable acrylate coating composition containing single base washed PTEA in pbw | PTE in pbw | Time in hours | Haze in % |
|---|---|---|---|---|---|
| 10 | 58 | 100 | 0 | 0 | 0.15 |
|    |    |     |   | 168 | 0.20 |
|    |    |     |   | 303 | 0.24 |
|    |    |     |   | 578 | 0.27 |
| 11 | 60 | 99.5 | 0.5 | 0 | 0.15 |
|    |    |      |     | 168 | 0.23 |
|    |    |      |     | 303 | 0.25 |
|    |    |      |     | 578 | 0.27 |
| 12 | 62 | 98.5 | 1.0 | 0 | 0.15 |
|    |    |      |     | 168 | 0.23 |
|    |    |      |     | 303 | 0.25 |
|    |    |      |     | 578 | 0.28 |

Examples 13-15: employed curable acrylate coating compositions identical to that described for Comparative Example 1 with an exception that the PTEA used to prepare the curable acrylate coating composition was subjected to a double base wash and was also optionally spiked with PTE. The curable acrylate coating compostions were then individually used to prepare multilayer films and the films were subjected to thermal ageing as described above. Examples 13-15 illustrate that the cured acrylate coating compositions prepared using a double base washed PTEA improves the performance of the multilayer films prepared using the composition.

The curable acrylate coating composition of example 13 was prepared by combining UCB Inc. RDX51027 epoxy acrylate (60 parts by weight (pbw)), double base-washed PTEA (40 pbw; as prepared in example 2), Ciba Specialty Chemicals IRGACURE 819 photoinitiator (0.50 pbw), and GE Silicones SILWET 7602 silicone copolymer (0.25 pbw). The mixture was heated to 85° C. and agitated several times over the course of 30 minutes until a homogeneous solution was obtained.

The curable acrylate coating compositions of example 14 and 15 were prepared by adding specific amounts of PTE to the curable acrylate coating composition of example 13, which are included in Table 5 below.

Multilayer films like that depicted in FIG. 2 were prepared using the curable acrylate coating compositions of examples 13 to 15 and thermal aging tests were carried out as described above.

The results shown in Table 5 below and in the FIG. 7, indicate that the use of a double base washed PTEA in the preparation of curable acylate coating compositions renders the compositions insensitive to the presence of minor amounts of PTE which may also present in the curable acrylate coating compositions.

TABLE 5

Figure 7:
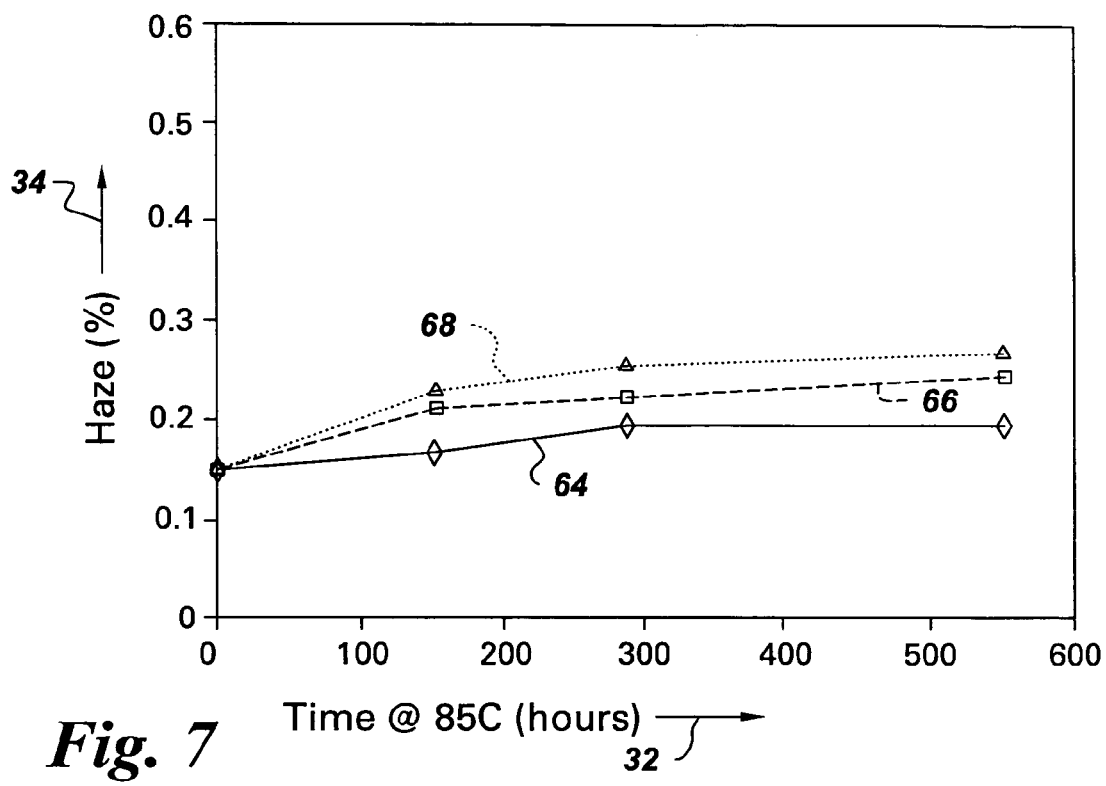

| Example | Corresponding curve in FIG. 7 | Curable acrylate coating composition containing 2 base washed PTEA in pbw | PTE in pbw | Time in hours | Haze in % |
|---|---|---|---|---|---|
| 13 | 64 | 100 | 0 | 0 | 0.15 |
|  |  |  |  | 168 | 0.16 |
|  |  |  |  | 303 | 0.20 |
|  |  |  |  | 578 | 0.20 |
| 14 | 66 | 99.5 | 0.5 | 0 | 0.15 |
|  |  |  |  | 168 | 0.22 |
|  |  |  |  | 303 | 0.23 |
|  |  |  |  | 578 | 0.25 |
| 15 | 68 | 98.5 | 1.0 | 0 | 0.15 |
|  |  |  |  | 168 | 0.23 |
|  |  |  |  | 303 | 0.26 |
|  |  |  |  | 578 | 0.27 |

Example 16-18: employed curable acrylate coating compositions identical to that described for Comparative Example 1 with an exception that the PTEA used to prepare the curable acrylate coating composition was subjected to a triple base wash and was also optionally spiked with PTE. The curable acrylate coating compositions were then individually used to prepare multilayer films and the films were subjected to thermal ageing as described above. Examples 16-18 illustrate that the cured acrylate coating compositions prepared using a triple base washed PTEA improves the performance of the multilayer films prepared using the composition.

The curable acrylate coating composition of example 13 was prepared by combining UCB Inc. RDX51027 epoxy acrylate (60 parts by weight (pbw)), triple base-washed PTEA (40 pbw; as prepared in example 3), Ciba Specialty Chemicals IRGACURE 819 photoinitiator (0.50 pbw), and GE Silicones SILWET 7602 silicone copolymer (0.25 pbw). The mixture was heated to 85° C. and agitated several times over the course of 30 minutes until a homogeneous solution was obtained.

The curable acrylate coating compositions of example 17 and 18 were prepared by adding specific amounts of PTE to the curable acrylate coating composition of example 16, which are included in Table 6 below.

Multilayer films like that depicted in FIG. 2 were prepared using the curable acrylate coating compositions of examples 16 to 18 and thermal aging tests were carried out as described above.

The results shown in Table 6 below and in the FIG. 8, indicate that the use of a triple base washed PTEA in the preparation of curable acrylate coating compositions renders the compositions insensitive to the presence of minor amounts of PTE which may also present in the curable acrylate coating compositions.

TABLE 6

Figure 8:
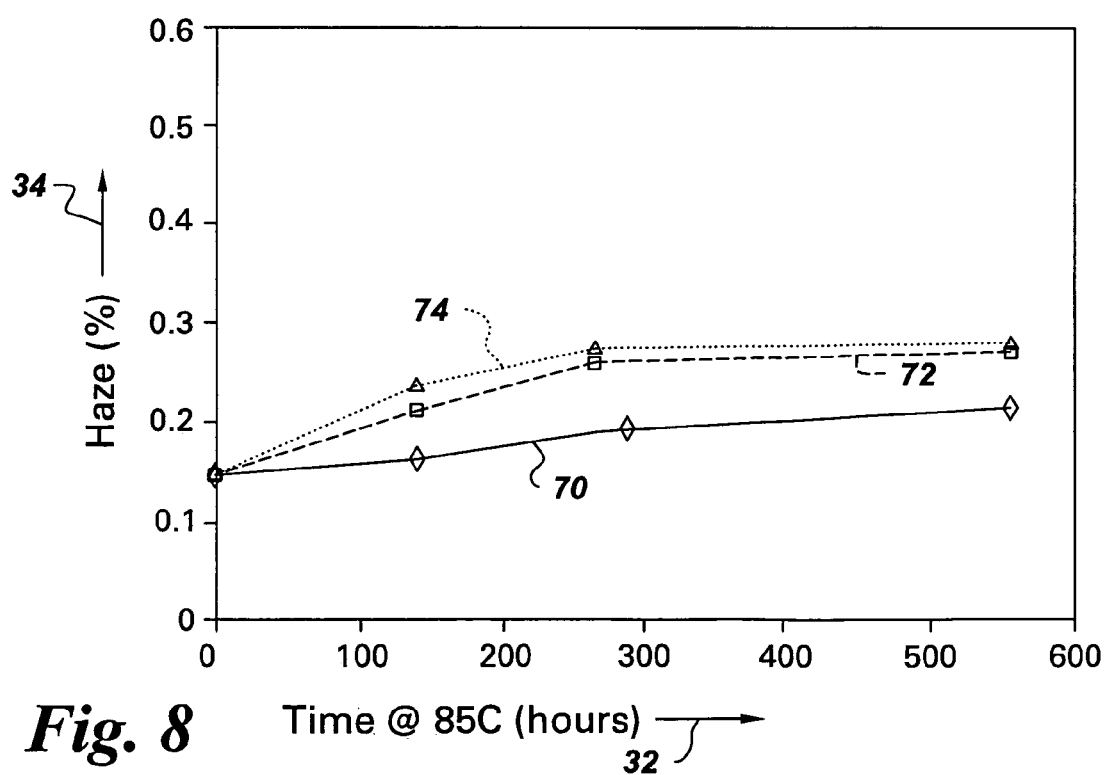

| Example | Corresponding curve in FIG. 8 | Curable acrylate coating composition containing triple base washed PTEA in pbw | PTE In pbw | Time in hours | Haze in % |
|---|---|---|---|---|---|
| 16 | 70 | 100 | 0 | 0 | 0.15 |
|  |  |  |  | 168 | 0.17 |
|  |  |  |  | 303 | 0.19 |
|  |  |  |  | 578 | 0.23 |
| 17 | 72 | 99.5 | 0.5 | 0 | 0.15 |
|  |  |  |  | 168 | 0.21 |
|  |  |  |  | 303 | 0.28 |
|  |  |  |  | 578 | 0.28 |
| 18 | 74 | 98.5 | 1.0 | 0 | 0.15 |
|  |  |  |  | 168 | 0.24 |
|  |  |  |  | 303 | 0.29 |
|  |  |  |  | 578 | 0.29 |

Example 19-21 employed curable acrylate coating compositions identical to that described for Comparative Example 1 with an exception that the PTEA used to prepare the curable acrylate coating composition was subjected to four base washes and was also optionally spiked with PTE. The curable acrylate coating compositions were then individually used to prepare multilayer films and the films were subjected to thermal ageing as described above. Examples 19-21 illustrate that the cured acrylate coating compositions prepared using a four times base washed PTEA improves the performance of the multilayer films prepared using the composition.

The curable acrylate coating composition of example 19 was prepared by combining UCB Inc. RDX51027 epoxy acrylate (60 parts by weight (pbw)), four times base-washed PTEA (40 pbw; as prepared in example 4), Ciba Specialty Chemical IRGACURE 819 photoinitiator (0.50 pbw), and GE Silicones SILWET 7602 silicone copolymer (0.25 pbw). The mixture was heated to 85° C. and agitated several times over the course of 30 minutes until a homogenous solution was obtained.

The curable acrylate coating compositions of example 20 and 21 were prepared by adding specific amounts of PTE to the curable acrylate coating composition of example 19, which are included in Table 7 below.

Multilayer films like that depicted in FIG. 2 were prepared using the curable acrylate coating compositions of examples 19 to 21 and thermal aging tests were carried out as described above.

The results shown in Table 7 below and in the FIG. 9, indicate that the use of a four times base washed PTEA in the preparation of curable acrylate coating compositions renders the composition insensitive to the presence of minor amounts of PTE which may also present in the curable acrylate coating compositions.

TABLE 7

Figure 9:
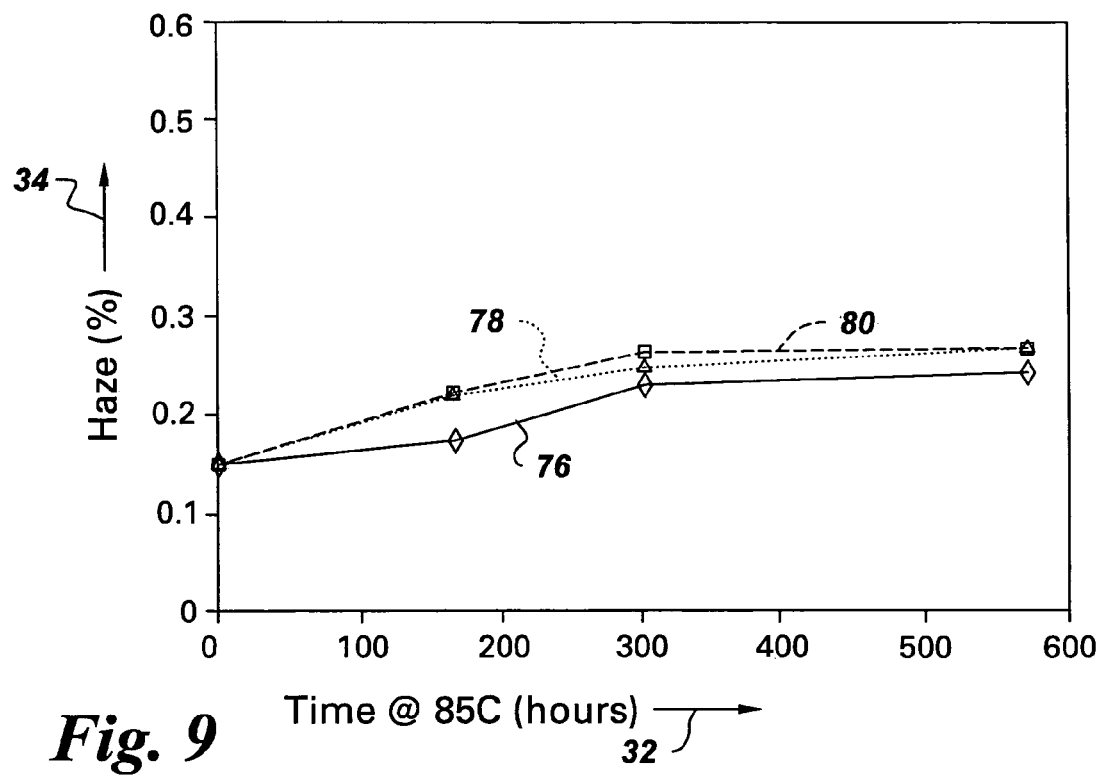

| Example | Corresponding curve in FIG. 9 | Curable acrylate coating composition containing 4 base washes PTEA in pbw | PTE in pbw | Time in hours | Haze in % |
|---|---|---|---|---|---|
| 19 | 76 | 100 | 0 | 0 | 0.15 |
|  |  |  |  | 168 | 0.18 |
|  |  |  |  | 303 | 0.24 |
|  |  |  |  | 578 | 0.26 |
| 20 | 78 | 99.5 | 0.5 | 0 | 0.15 |
|  |  |  |  | 168 | 0.23 |
|  |  |  |  | 303 | 0.28 |
|  |  |  |  | 578 | 0.29 |

TABLE 7-continued

| Example | Corresponding curve in FIG. 9 | Curable acrylate coating composition containing 4 base washes PTEA in pbw | PTE in pbw | Time in hours | Haze in % |
|---|---|---|---|---|---|
| 21 | 80 | 98.5 | 1.0 | 0 | 0.15 |
| | | | | 168 | 0.23 |
| | | | | 303 | 0.27 |
| | | | | 578 | 0.29 |

Examples 22-24: employed curable acrylate coating compositions identical to that described for Comparative Example 1 with an exception that the PTEA used to prepare the curable acrylate coating composition was subjected to five base washes and was also optionally spiked with PTE. The curable acrylate coating compositions were then individually used to prepare multilayer films and the films were subjected to thermal ageing as described above. Examples 22-24 illustrate that the cured acrylate coating compositions prepared using a five times base washed PTEA improves the performance of the multilayer films prepared using the composition.

The curable acrylate coating composition of example 22 was prepared by combining UCB Inc. RDX51027 epoxy acrylate (60 parts by weight (pbw)), five times base-washed PTEA (40 pbw; as prepared in example 5), Ciba Specialty Chemicals IRGACURE 819 photoinitiator (0.50 pbw), and GE Silicones SILWET 7602 silicone copolymer (0.25 pbw). The mixture was heated to 85° C. and agitated several times over the course of 30 minutes until a homogeneous solution was obtained.

The curable acrylate coating compositions of example 23 and 24 were prepared by adding specific amounts of PTE to the curable acrylate coating composition of example 22, which are included in Table 8 below.

Multilayer films like that depicted in FIG. 2 were prepared using the curable acrylate coating composition of examples 22 to 24 and thermal aging tests were carried out as described above.

The results shown in Table 8 below and in the FIG. 10, indicate that the use of a five times base washed PTEA in the preparation of curable acrylate coating compositions renders the compositions insensitive to the presence of minor amounts of PTE which may also present in the curable acrylate coating compositions.

TABLE 8

Figure 10:
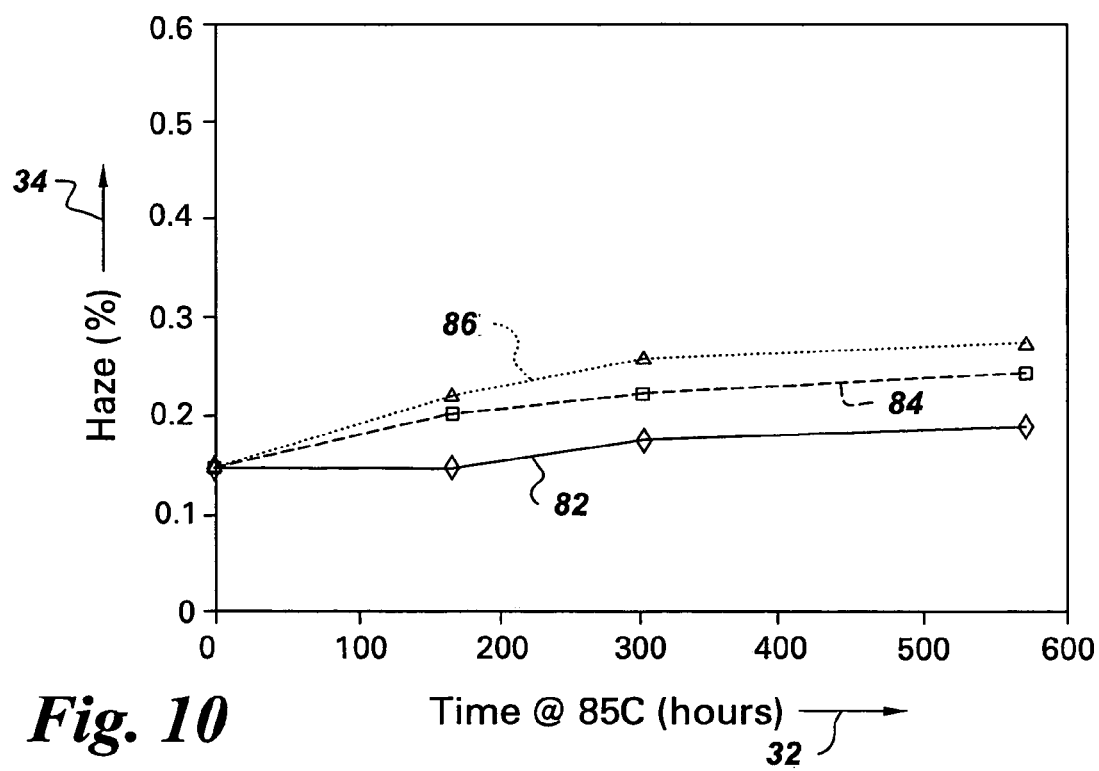

| Example | Corresponding curve in FIG. 10 | Curable acrylate coating composition containing 5 base washes PTEA in pbw | PTE in pbw | Time in hours | Haze in % |
|---|---|---|---|---|---|
| 22 | 82 | 100 | 0 | 0 | 0.15 |
| | | | | 168 | 0.15 |
| | | | | 303 | 0.18 |
| | | | | 578 | 0.19 |
| 23 | 84 | 99.5 | 0.5 | 0 | 0.15 |
| | | | | 168 | 0.21 |
| | | | | 303 | 0.22 |
| | | | | 578 | 0.24 |
| 24 | 86 | 98.5 | 1.0 | 0 | 0.15 |
| | | | | 168 | 0.22 |
| | | | | 303 | 0.26 |
| | | | | 578 | 0.27 |

Although, the utility of the method of the present invention to control haze is illustrated experimentally herein in terms of controlling haze in articles comprising UV curable acrylate coating compositions containing unsubstituted PTEA of formula III, the present invention encompasses the control of haze generally in articles fabricated using compositions comprising a wide variety of substituted PTEA's, wherein said compositions can be cured using heat or UV. Thus, while the description and experimental details that follow focus on control of haze in articles fabricated from unsubstituted PTEA, the invention is in no way limited thereto. In its broadest sense, the present invention includes the control of haze in articles fabricated from any and all PTEA containing less than about 400 ppm tin and less than about 2 weight percent of the corresponding PTE.

The invention has been described in detail with particular reference to preferred embodiments thereof, but it will be understood by those skilled in the art that variations and modifications can be effected within the spirit and scope of the invention.

What is claimed is:

1. A composition comprising:
   (a) a phenylthioethylacrylate having formula I

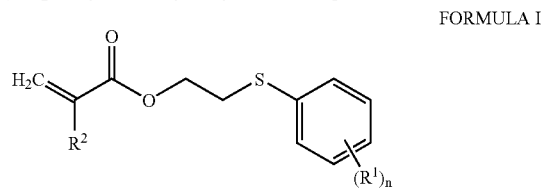

FORMULA I wherein $R^1$ is independently at each occurrence selected from the group consisting of a $C_1$-$C_{10}$ aliphatic radical, a $C_3$-$C_{20}$ aromatic radical and a $C_3$-$C_{12}$ cycloaliphatic radical and "n" has a value 0-5, said phenylthioethylacrylate comprising less than about 400 parts per million tin, said phenylthioethylacrylate comprising less than 2 percent by weight of the corresponding phenylthioethanol having formula II

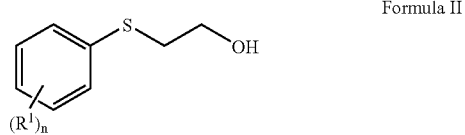

Formula II wherein $R^1$ is independently at each occurrence selected from the group consisting of a $C_1$-$C_{10}$ aliphatic radical, a $C_3$-$C_{20}$ aromatic radical and a $C_3$-$C_{12}$ cycloaliphatic radical and "n" has a value 0-5;
   (b) at least one multifunctional (meth)acrylate;
   (c) at least one curing agent.

2. The composition according to claim 1, further comprising at least one unsaturated acid, said unsaturated acid being present in an amount corresponding to from about 0.1 to about 1.0 weight percent based on the total weight of the composition.

3. The composition according to claim 2 wherein, said unsaturated acid has formula VIII

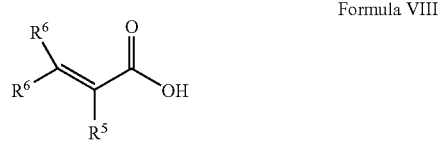

Formula VIII wherein $R^5$ and $R^6$ are independently at each occurrence selected from the group consisting of hydrogen, a —C(O)—OH group, a $C_1$-$C_6$ aliphatic radical, $C_3$-$C_{20}$ cycloaliphatic radical, and a $C_2$-$C_{20}$ aromatic radical.

4. The composition according to claim 2 wherein, said unsaturated acid is selected from the group consisting of acrylic acid and methacrylic acid.

5. The composition according to claim 2 wherein, said unsaturated acid is present in an amount corresponding to from 0.2 percent to about 0.5 percent by weight of the total weight of the composition.

6. The composition according to claim 1, further comprising at least one surface active agent.

7. The composition according to claim 6 wherein, said surface active agent is selected from the group consisting of silicon containing surface active agents.

8. The composition according to claim 1, wherein said phenylthioethylacrylate has formula III Formula III wherein said phenylthioethylacrylate comprises less than about 400 parts per million tin and said phenylthioethylacrylate comprises less than about 2 percent by weight of the corresponding phenylthioethanol having formula IV Formula IV 9. The composition according to claim 1 wherein, the multifunctional (meth)acrylate is represented by formula V

FORMULA V $$\left( H_2C=\overset{R^3}{\underset{|}{C}}-\overset{O}{\underset{\|}{C}}-X^1 \right)_n R^4$$

wherein $R_3$ is hydrogen or $C_1$-$C_{10}$ aliphatic radical; $X_1$ is O or S; $R_4$ is selected from the group consisting of $C_1$-$C_{20}$ aliphatic radical, a $C_3$-$C_{30}$ aromatic radical and a $C_3$-$C_{20}$ cycloaliphatic radical and "n" is an integer having a value of 2 to 4.

10. The composition according to claim 1 wherein, said multifunctional (meth)acrylate is represented by formula VII Formula VII 11. The composition according to claim 1 wherein, said curing agent is selected from the group consisting of ultraviolet curing agents and thermal curing agents.

12. The composition according to claim 1 wherein, said phenylthioethylacrylate is present in an amount corresponding to from about 35 percent by weight to about 45 percent by weight of the total weight of the composition.

13. The composition according to claim 1 wherein, said multifunctional (meth)acrylate is present in an amount corresponding to from about 55 percent by weight to about 65 percent by weight of the total weight of the composition.

14. A composition comprising:
(a) a phenylthioethylacrylate having formula III

Formula III wherein said phenylthioethylacrylate comprising less than about 400 parts per million tin, said phenylthioethylacrylate comprising less than 2 percent by weight of the corresponding phenylthioethanol having formula IV Formula IV (b) at least one multifunctional (meth)acrylate; and
(c) at least one curing agent.

15. The composition according to claim 14, further comprising at least one unsaturated acid, said unsaturated acid being present in an amount corresponding to from about 0.1 weight percent to about 1.0 weight percent based on the total weight of the composition.

16. A method for preparing a composition, wherein said method cmoprises
(i) blending coponents (a)-(d) to form a mixture wherein
(a) is a phenylthioethylacrylate having formula I

FORMULA I wherein $R_1$ is independently at each occurrence selected from the group consisting of a $C_1$-$C_{10}$ aliphatic radical, a $C_3$-$C_{20}$ aromatic radical and $C_3$-$C_{12}$ cycloaliphatic radical, $R^2$ is a $C_1$-$C_{10}$ aliphatic radical and "n" has a value 0-5, said phenylthioethylacrylate comprising less than about 400 parts per million tin, said phenylthioethylacrylate comprising less than 2 percent by weight of the corresponding phenylthioethanol having formula II Formula II wherein $R^1$ is independently at each occurrence selected from the group consisting of a $C_1$-$C_{10}$ aliphatic radical, a $C_3$-$C_{20}$ cycloaliphatic radical and "n" has a value 0-5;
(b) is at least one multifunctional (meth)acrylate; and
(c) is at least one curing agent; and
(ii) heating the mixture to form a homogenous composition.

* * * * *